(12) United States Patent
Mossbeck et al.

(10) Patent No.: US 6,408,514 B1
(45) Date of Patent: Jun. 25, 2002

(54) MANUFACTURE OF POCKETED COMPOUND NESTED COIL SPRINGS

(75) Inventors: Niels S. Mossbeck; Thomas J. Wells, both of Carthage, MO (US)

(73) Assignee: L&P Property Management Company, South Gate, CA (US)

(*) Notice: Subject to any disclaimer, the term of this patent is extended or adjusted under 35 U.S.C. 154(b) by 6 days.

(21) Appl. No.: 09/584,606

(22) Filed: May 31, 2000

Related U.S. Application Data

(63) Continuation of application No. PCT/US99/19419, filed on Aug. 25, 1999, which is a continuation-in-part of application No. 09/139,448, filed on Aug. 25, 1998.

(51) Int. Cl.[7] ................................................. B21F 35/00
(52) U.S. Cl. ..................... 29/896.92; 29/91; 140/3 CA; 53/114
(58) Field of Search ............................... 29/896.92, 91; 140/3 CA; 53/114; 267/85, 86

(56) References Cited

U.S. PATENT DOCUMENTS

| | | |
|---|---|---|
| 882,654 A | 3/1908 | Smith |
| 914,312 A | 3/1909 | Rutson |
| 1,192,510 A | 7/1916 | Fischmann |
| 1,254,314 A | 1/1918 | D'Arcy |
| 1,544,237 A | 6/1925 | Karr |
| 2,241,039 A | 5/1941 | Mattison |
| 2,567,520 A | 9/1951 | McInerney et al. |
| 2,724,842 A | 11/1955 | Rogovy |
| 2,983,236 A | 5/1961 | Thompson |
| 3,588,993 A | 6/1971 | Turner |
| 3,668,816 A | 6/1972 | Thompson |
| 3,862,751 A | 1/1975 | Schwaller |
| 4,111,241 A | 9/1978 | Crown |
| 4,439,977 A | 4/1984 | Stumpf |
| 4,519,107 A | 5/1985 | Dillon et al. |
| 5,014,004 A | 5/1991 | Kreibich et al. |
| RE35,453 E | 2/1997 | Rodgers |
| 5,613,287 A | 3/1997 | St. Clair |
| 5,699,998 A | 12/1997 | Zysman |
| 5,740,597 A | 4/1998 | Eto |

FOREIGN PATENT DOCUMENTS

| | | |
|---|---|---|
| DE | 3842211 | 6/1990 |
| GB | 20583 | of 1911 |
| GB | 148768 | 7/1920 |
| GB | 376291 | 8/1932 |
| GB | 618602 | 4/1949 |
| JP | 56123157 | 9/1981 |
| JP | 59129021 | 7/1984 |
| WO | PCT WO 9825503 | 7/1997 |

OTHER PUBLICATIONS

Spuhl, *Automatic Pocket Spring Maching (TF-290)*, Brochure, Mar. 30, 1996.

Primary Examiner—P. W. Echols
(74) Attorney, Agent, or Firm—Wood, Herron & Evans, LLP

(57) ABSTRACT

A system and method for manufacturing pocketed compound nested coil springs includes inserting a compressed, preferably pocketed, smaller coil spring into a vertically oriented larger coil spring either prior to compressing and inserting the outer coil spring into pocket material or after the larger coil spring has been compressed and prior to being encapsulated in the pocket. Alternative systems and methods are also contemplated which include forming the outer coil spring around the inner coil spring and pocketing the resulting nested spring unit.

23 Claims, 6 Drawing Sheets

MANUFACTURE OF POCKETED COMPOUND NESTED COIL SPRINGS

This is a continuation of PCT Application Serial No. PCT/US99/19419, filed Aug. 25, 1999 and designating the United States, which claims priority to and is a continuation-in-part of U.S. application Ser. No. 09/139,448, filed Aug. 25, 1998, now abandoned. Each of these identified applications are hereby expressly incorporated by reference in their entirety.

BACKGROUND OF THE INVENTION

The invention relates generally to the construction of spring assemblies or the like. More particularly, it relates to the manufacture of strings of pocketed coil springs for use as the spring cores for mattresses, seat cushions or the like.

Mattress spring core construction over the years has been a continuously improving art with advancements in materials and machine technology. A well known form of spring core construction is known as a Marshall spring construction wherein metal coil springs are encapsulated in individual pockets of fabric and formed as elongate or continuous strings of pocketed coil springs. In an early form, these strings of coil springs were manufactured by folding an elongate piece of fabric in half lengthwise to form two plies of fabric and stitching transverse and longitudinal seams to join the plies of fabric to define pockets within which the springs were enveloped.

Recently, improvements in spring core constructions have involved the use of fabrics which are thermally or ultrasonically weldable to themselves. By using such welding techniques, these fabrics have been advantageously used to create strings of individually pocketed coil springs wherein transverse and longitudinal welds instead of stitching are used to form the pockets encapsulating the springs.

Once strings of pocketed springs are constructed, they may be assembled to form a spring core construction for a mattress, cushion or the like by a variety of methods. For example, multiple or continuous strings may be arranged in a row pattern corresponding to the desired size and shape of a mattress or the like and adjacent rows of strings may be interconnected by a variety of methods. The result is a unitary assembly of pocketed coil springs serving as a complete spring core assembly.

One improvement upon pocketed coil springs as described is a compound nested pocketed coil spring in which each pocket of a string includes two nested coil springs. In such designs, a first inner spring is typically shorter and smaller than a second outer spring. The first inner spring is nested within the second outer spring.

Spring core constructions employing compound nested pocketed springs provide the advantage of offering differing degrees of hardness to the spring unit. Varying degrees of hardness are usually achieved by varying the number of springs per unit area, commonly referred to as the "spring count" of the unit, or by changing the gauge of the wire from which the springs are manufactured. Compound nested pocketed spring coils are disclosed in PCT Application No. PCT/GB97/01759; U.S. Pat. Nos. 1,192,510; 2,567,520; 1,254,314; 882,654; and U.K. Patent No. 20,583. The inner and outer coil springs are nested so that the lower portion of the combined spring unit is reinforced by the inner spring making this portion of the unit much stronger than the upper portion. The upper portion may be flexible enough to provide a resilient and comfortable seating or sleeping surface and the lower portion strong enough to absorb abnormal stresses, weight concentrations or shocks without discomfort or damage.

Commonly, the inner spring of the nested compound spring unit is individually encased in a pocketed fabric material such as shown in U.S. Pat. No. 1,192,510, to minimize noise or interference during the flexing or compression of the compound spring unit.

Another advantage of such compound spring units when employed in a mattress or the like is that the inner spring of each compound nested spring unit is free floating or unsecured. As a result, when the mattress is inverted, the inner spring falls by gravity toward the lower face of the mattress. In this way, regardless of whether the mattress is inverted or flipped, the inner spring is always at the bottom portion of the spring unit and the compound nested spring units provide a varying degree of flexure from the top to the bottom of the spring unit.

Even though spring units constructed from strings of pocketed compound nested coil springs as described provide many advantages, the manufacture and construction of strings of pocketed compound nested coil springs has proven to be very complicated and often problematic resulting in increased expense for such strings. The construction of strings of pocketed coil springs with a single spring in each pocket is well known in the art and, for example, disclosed in U.S. Pat. No. 4,439,977 which is hereby incorporated by reference in its entirety. The system disclosed in U.S. Pat. No. 4,439,977 includes a spring coiler which forms a coil spring and deposits it about the upper end of an arcuate delivery horn. As such, the formed coil spring is delivered by gravity in a generally vertical orientation for subsequent compression and insertion into the pocketing fabric material.

Other systems for manufacturing pocket spring assemblies with single springs in each pocket are disclosed in PCT Patent Application No. WO94/18116 and U.S. patent application Ser. No. 08/927,051 filed Sep. 10, 1997, each of which are expressly incorporated herein by reference. In each of these identified patent applications, a formed coil spring is deposited from the coiler in a generally vertical orientation for subsequent processing, including pocketing in a fabric or similar material. In the identified PCT application, a spring feeding assembly includes a chute which delivers successive springs emerging from the spring coiler into a vertical tube. Each vertically oriented spring in the tube is compressed by a ram and advanced by a plunger into a passage which maintains the spring in a compressed state for subsequent pocketing. The system in the previously identified U.S. patent application includes a split cylinder which receives a coil spring from a coiling machine. A compression member compresses the coil spring in the cylinder and the spring is pushed into the space between the lower and upper plies of the folded length of fabric. The split cylinder is supported for pivotal movement between an inclined position in line with the spring coiling machine for receipt of the spring and an upright generally vertical position. The cylinder is pivoted between a 45° angle for receipt of the spring and a generally vertically upright orientation for delivery of the compressed spring between the plies of fabric. In each of these systems, the compressed spring is not substantially reoriented prior to insertion between the plies of fabric. In other words, the longitudinal axis of the compressed spring is generally vertical from the time it is delivered from the coiler until after it has been encapsulated in a pocket.

Another well known system for pocketing coil springs is commercially available from Spühl AG in Switzerland.

Examples of such machines include the Spühl TF 90, 190 and 290 series machines. In such machines, a coiler forms a spring and deposits the spring into a trough in a generally horizontal orientation. The spring is then compressed horizontally by a compression paddle, rotated through 90° and then while remaining compressed is inserted between the plies of a folded fabric which is subsequently formed into a pocket around the individual spring. One system for pocketing compound nested springs from a horizontal orientation is disclosed in U.K. Patent Application Serial No. 9726333.9, published as PCT Application No. WO99/30853 on Jun. 24, 1999 and hereby incorporated by reference.

While these systems provide opportunities to manufacture pocketed coil springs, there is a need to provide a system which can be utilized on a production basis and lend itself to further automation of the procedure for the manufacture of pocketed compound nested coil springs, particularly for known systems which deposit the formed spring in a vertical orientation prior to the pocketing procedure and as a result do not require re-orientation.

SUMMARY OF THE INVENTION

It has therefore been a primary objective of this invention to provide a method and system for the manufacture of strings of pocketed compound nested coil springs.

It has been a further objective of this invention to provide such a method and system which is reliable and cost effective for application in a fully automatic production facility.

It has been a still further objective of this invention to provide such a method and system which is particularly adapted for use with existing production systems for pocketing coil springs, particularly those in which the coil spring is deposited in a generally vertical attitude and therefore does not require re-orientation prior to being compressed and pocketed.

These and other objectives of the invention have been achieved by a system and method for forming a string of pocketed compound nested coil springs in which, in a first embodiment, a first smaller spring is initially formed and preferably pocketed. The smaller coil springs can be produced by known pocketing coil spring machines in which the individual pocketed springs are separated from the string and collected. Larger coil springs are also formed and then deposited onto a platform in a generally vertical attitude. In the first presently preferred embodiment of this invention, the pocketed individual smaller coil springs are then deposited vertically into one of the larger outer coil springs located in a vertical orientation on the platform. The inner coil springs pass through the upper terminal coil of the larger coil springs and into the interior of the larger coil spring thereby becoming nested within the larger coil spring. The resulting compound spring unit is then compressed from a generally vertical reciprocating plunger with the longitudinal axes of the inner and outer springs generally vertical and preferably co-linear. The compound compressed nested spring unit is then inserted between the plies of a folded fabric by an insertion plunger for subsequent pocketing.

In a second alternative presently preferred embodiment, the smaller and the larger coil spring are each compressed with the longitudinal axes of the springs generally vertical. Each coil spring is seated on the operating end of an insertion plunger and a separator plate is positioned between the insertion plungers and the smaller and larger compressed coil springs. The insertion plungers and separator plate extend the springs between the plies of a folded fabric pocketing material. Initially, the separator plate retracts thereby allowing the smaller coil spring to pass through the terminal end coil of the larger coil spring thereby becoming nested within the larger coil spring while still being compressed and contained between the plies of the pocketing material and in the insertion plungers. The insertion plungers then retract leaving the compressed and nested springs between the plies of the fabric material. Subsequently, the pocket is formed around the compound nested spring unit for the formation of a string of pocketed compound nested coil spring units.

In still another presently preferred embodiment of the invention, the larger coil springs are individually pocketed in fabric which is folded on both sides with a small overlap of material on a side of the string of pocketed coils. The individual larger coil springs are separated by a transverse or lateral seam preferably in the form of a thermal weld. A string of pocketed coil springs of this type is commonly referred to as a side seam string of pocketed coil springs because the opposing terminal free edges of the fabric overlap one another on a side of the string and the coils springs as opposed to the top or bottom thereof. As such, a longitudinal weld or seam in the string extending perpendicular to the transverse seams or welds is not required. Once the string of pocketed coil springs is formed, a compressed smaller inner coil spring, preferably pocketed, is inserted through the side seam and into the interior of the expanded larger coil spring in each pocket. The overlapping flaps of fabric are separated to provide access to the interior of the larger coil spring within the pocket for insertion of the compressed smaller inner coil spring.

In other presently preferred alternative embodiments of the invention, the outer larger coil spring is formed or coiled around the smaller inner coil spring which may be compressed, expanded, pocketed or simultaneously being formed within the developing interior of the larger outer coil spring. Preferably, in specific embodiments, the outer coil spring is formed with left-hand or right-hand turned convolutions and the inner coil spring is formed with the opposite hand turned convolutions to avoid interference between the inner and outer coil springs if the inner coil spring is not pocketed.

As a result of the present invention, systems and methods for manufacturing strings of pocketed compound nested coil springs are provided which are compatible with conventional machinery for pocketing coil springs in a fully automatic production capability.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 3:
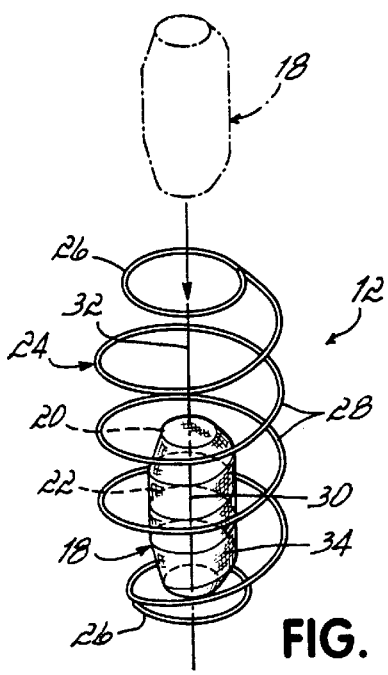
FIG. 3 is a schematic representation of a pocketed smaller coil spring being deposited into an upper terminal coil of a larger coil spring according to the first presently preferred embodiment of this invention.
Figure 4:
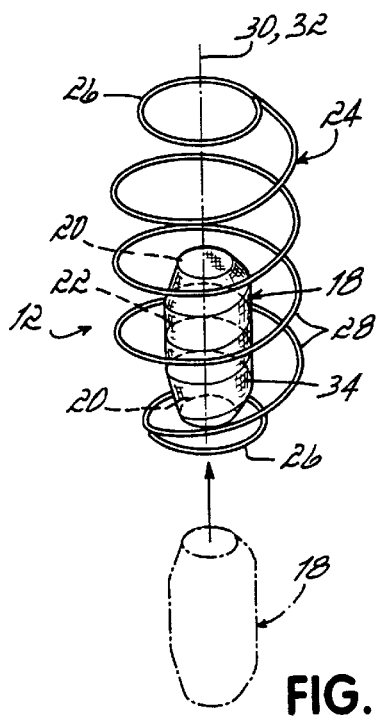
FIG. 4 is a view similar to FIG. 3 with the smaller coil spring being deposited into the lower terminal coil of the larger coil spring.
Figure 2:
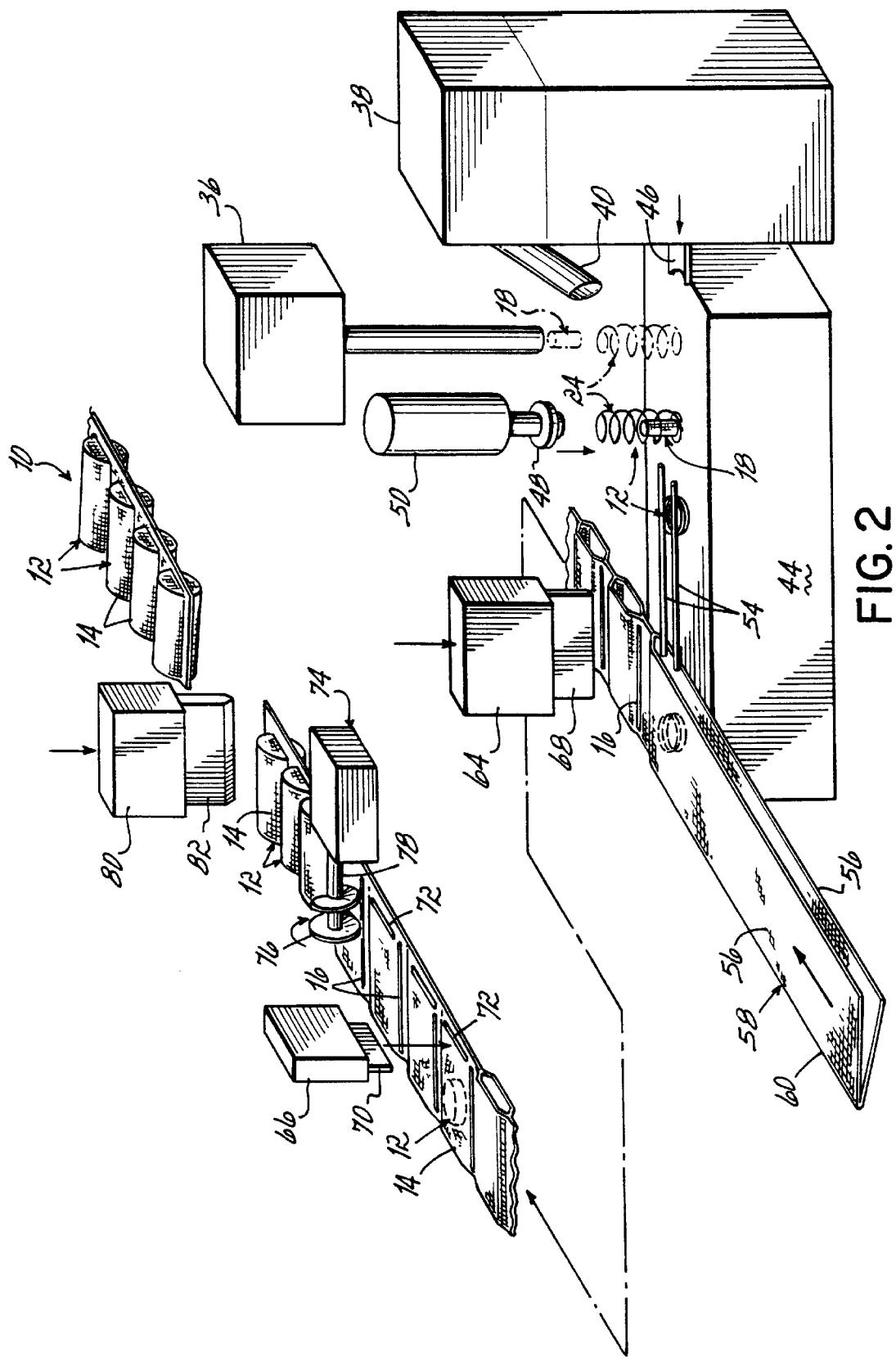
FIG. 2 is a schematic representation of a production system for manufacturing a string of pocketed compound nested coil springs according to a first presently preferred embodiment of this invention.

Referring to FIG. 2, a first presently preferred embodiment of a system and method for manufacturing a string 10 of pocketed compound nested coil springs is shown. The string 10 includes a plurality of compound nested spring units 12 each of which are encapsulated in a fabric pocket 14 and separated from adjacent similar compound nested coil spring units 12 by a seam 16. Each compound nested spring unit 12 includes a first inner smaller coil spring 18 which is typically barrel-shaped in which the terminal coils 20 have a smaller diameter than the intermediate coils 22 (FIGS. 6–7. The first inner coil spring 18 of the compound nested spring unit 12 is nested within a second outer larger coil spring 24 which is also typically barrel-shaped with the terminal end coils 26 having a smaller diameter than the intermediate coils 28 (FIGS. 3 and 4). The first and second coil springs 18, 24 each have a plurality of coils which are normally spaced in an uncompressed spring coil configuration. Preferably, the uncompressed height of the first coil spring 18 is less than the uncompressed height of the second coil spring 24; likewise, preferably the diameter of the terminal coils 26 of the second coil spring 24 is greater than an overall diameter of the inner coil spring 18 so that the inner coil spring 18 can be inserted into and entirely contained and retained within the second outer coil spring 24. Each of the coil springs 18, 24 preferably has a longitudinal axis 30, 32 extending along a center line of the coil spring 18, 24 between the terminal coils 20, 26 thereof. Preferably, the first inner coil spring 18 is free floating or unsecured when nested within the second outer coil spring 24.

Preferably, the first inner coil spring 18 is an individual pocketed coil spring in which the spring is encased within a pocketed fabric 34. The individually pocketed first coil springs 18 may be produced according to any known conventional method and system, such as that shown in U.S. Pat. No. 4,439,977 or according to a Spühl pocketing machine as discussed previously herein.

Furthermore, the system disclosed in FIG. 2 is substantially similar to known pocketing machines for single coil springs with the exception of the modifications to be discussed herein for the production of a string 10 of compound nested pocketed coil springs 12. Specifically, the system shown in FIG. 2 includes a first coiler or coiling station 36 for the production of the first inner coil springs 18. Alternatively, the first coiling station 36 may comprise an entire apparatus for making pocketed coil springs as is well known in the art. The system of FIG. 2 also includes a second coiling station or coiler 38. Each of the coilers 36, 38 are operative to automatically form helical coil springs in synchronized relation with the other operations of the system. The coilers 36, 38 may take any known form for accomplishing the production of coil springs as employed in the strip of pocketed springs. An example of a coiling station 36 or 38 is disclosed in detail in U.S. pending patent application Ser. No. 08/916,493 filed Aug. 22, 1997 and issued as U.S. Pat. No. 5,934,339 on Aug. 10, 1999, assigned to the assignee of the present invention and hereby incorporated by reference in its entirety.

The larger outer coil spring 24 is deposited from the tube or transfer station 40 onto the platform 44 in a generally vertical orientation where the first inner coil spring 18 is deposited from the coiler or pocketed spring forming machine 36 downwardly through the upper terminal coil 26 of the larger outer coil spring 24 (FIG. 3). Additional guides or support members (not shown) for the springs 18, 24 may be provided on the platform 44 to maintain the springs 18, 24 in the generally vertical orientation.

Once the springs 18, 24 are nested on the platform 44, an insertion plunger 46 extends to advance the compound nested spring unit 12 for positioning below a compression plunger 48 which vertically reciprocates from a pneumatic cylinder 50 or the like. The compression plunger 48 engages the compound nested spring unit 12 and compresses the spring unit 12 downwardly on the platform 44. As an alternative to the system shown in FIG. 2, the inner smaller coil spring 18 may be inserted into the lower terminal coil 26 of the larger outer coil spring 24 for nesting as shown in FIG. 4.

After the spring unit 12 is compressed and the springs 18, 24 with their longitudinal axes 30, 32 generally vertical, the insertion plunger 46 translates forwardly to push the compressed springs 18, 24 into an insertion track 54 on the platform 44. Continued forward travel of the insertion plunger 46 inserts the compressed nested springs 18, 24 between spaced plies 56 of an elongate fabric material 58 passing generally perpendicularly past the platform 44. The plies 56 of the fabric 58 are the result of an elongate sheet of fabric 58 being folded about a longitudinal fold line 60. The fabric folder (not shown) may take any of a number of well known forms for folding the sheet of fabric 58 as the fabric 58 is drawn from a roll (not shown) or the like. The remainder of the pocketing apparatus and system for forming the string 10 of pocketed coil springs is conventional and well known as exemplified by the Spühl-type machines previously discussed, with the exception that the spring being pocketed is a compound nested spring unit 12.

The compound nested spring unit 12 is maintained in a compressed configuration with the longitudinal axes 30, 32 of the springs 18, 24 generally vertical and perpendicular to the direction of travel of the fabric 58 and the longitudinal fold line 60 thereof. Individual pockets 14 for the spring units 12 are formed by a first transverse welding station 64 and a second longitudinal welding station 66. The specific embodiment for forming the individual pockets 14 disclosed herein contemplates the use of ultrasonic thermal welding devices for joining the plies 56 of fabric 58 to form the pockets 14 for the springs 18, 24 and, preferably, the utilization of thermally weldable fabric 58 as the pocket material. The present invention, however, should not be regarded as limited to these particular features, inasmuch as other known materials and techniques for joining layers of fabric such as by sewing, the use of mechanical fasteners such a grommets or rivets or clamps or the like may be employed within the scope of this invention. Moreover, alternate systems for pocketing coil springs may also be employed within the scope of the present invention.

The first weld station 64 includes a weld head 68 which projects downwardly to contact the folded fabric 58 between adjacent nested spring units 12 and thereby forming the transverse weld or seam 16 between the adjacent spring units 12. The fabric 58 is then indexed forwardly a plurality of positions, preferably three to four positions, until the second weld station 66 having a weld head 70 forms a longitudinal seam 72 and thereby completes the pocket 14 for the spring unit 12. Downstream from the second weld station 66 is a turning station 74 which, in a particularly preferred embodiment, includes at least one, preferably more, augers 76 mounted on a shaft 78 for rotation to thereby turn the springs 18, 24 within the formed pocket 14 so that the longitudinal axes 30, 32 of the springs 18, 24 are generally horizontal and extending between the fold line 60 and longitudinal seam 72 thereby allowing the springs 18, 24 to expand within the pockets 34, 14. Further downstream from the spring turning station 74 is a cutting station 80 which includes a knife, thermal cutter or similar device 82 for separating a selected number of pocketed spring units 12 to form the string 10 of pocketed compound nested coil springs according to the first presently preferred embodiment of the invention.

Figure 8:
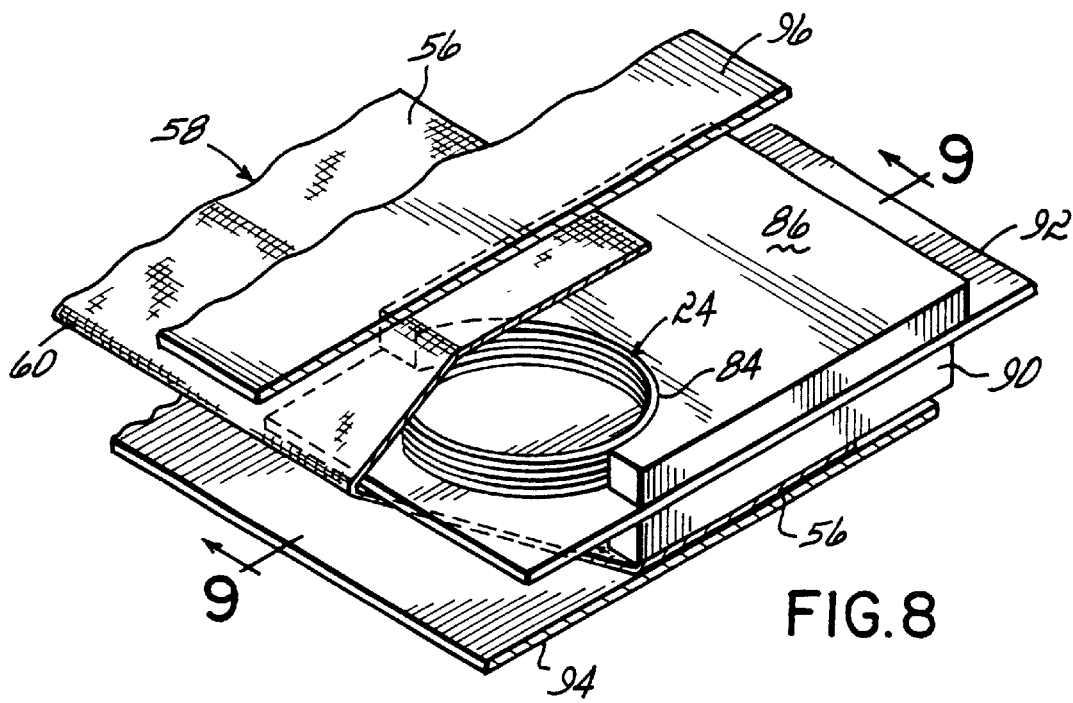
FIG. 8 is a schematic representation of a still further alternative preferred embodiment in which the formed and compressed inner and outer coil springs are being inserted by respective plungers separated by a separator plate between the plies of a folded fabric.
Figure 9:
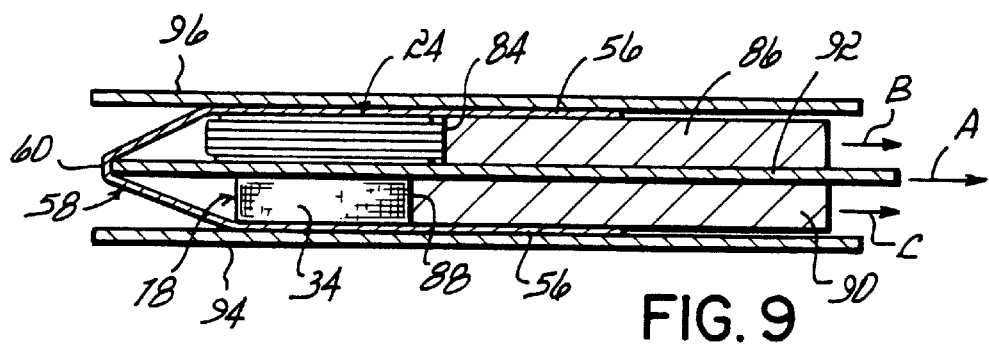
FIG. 9 is a cross-sectional view taken along line 9—9 of FIG. 8.
Figure 10:
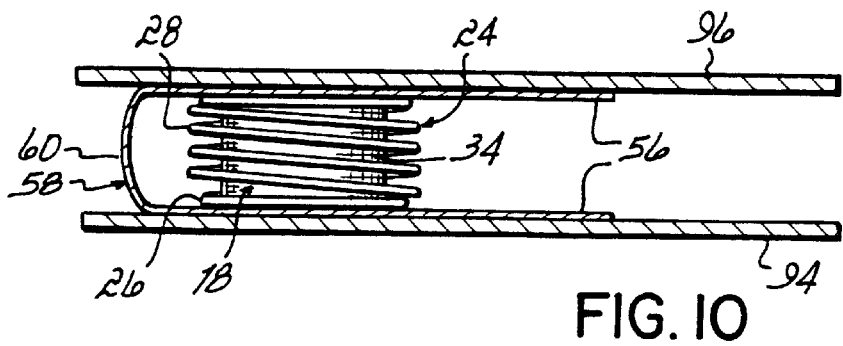
FIG. 10 is a view similar to FIG. 9 of the plungers and separator plate retracted and the springs nested and compressed as a compound spring unit within the pocketing material.

Referring to FIGS. 8–10, an alternative presently preferred embodiment of a system and method for producing the string 10 of pocketed compound nested coil springs 12 is shown. Features and elements of the second presently preferred embodiment of the invention as shown in FIG. 8–10, which are substantially similar to corresponding elements shown in FIG. 2, are identified by identical reference numerals with respect to those elements in FIG. 2.

The first inner coil spring 18 and the second outer coil spring 24, according to the embodiment of the invention shown in FIGS. 8–10, are manufactured according to known techniques, for example, known coilers or spring coil forming machines as previously identified. The second larger outer coil spring 24 is compressed and seated within an arcuate notch 84 at the end of an upper insertion plunger 86. Similarly, the first smaller inner coil spring 18 is compressed and seated within an arcuate notch 88 of a lower insertion plunger 90. The longitudinal axes 30, 32 of the springs 18, 24 are generally vertical and preferably co-linear. The insertion plungers 86, 90 and associated springs 18, 24 are separated by a separator plate 92. As shown in FIG. 8, the insertion plungers 86, 90, associated springs 18, 24 and separation plate 92 project into the folded fabric 58 and between the plies 56 thereof toward the longitudinal fold line 60. In the embodiment shown in FIG. 8–10, the fabric is folded similar to that of FIG. 2. The fabric 58 is folded and the springs 18, 24 are compressed between a lower compression plate 94 and an upper compression plate 96.

After the springs 18, 24 are inserted by the insertion plungers 86, 90 into the fabric 58, the separator plate 92 is initially retracted as shown by Arrow A in FIG. 9 thereby leaving the springs 18, 24 and plungers 86, 90 in the fabric. Subsequently, the plungers 86, 90 are simultaneously retracted as shown by Arrows B and C thereby leaving the springs 18, 24 in the fabric 58 between the upper and lower compression plates 94, 96. After the separator plate 92 is retracted, the lower spring 18 is nested into the lower terminal coil 26 of the larger outer spring 24 until it contacts the uppermost ply 56 of fabric 58 and the larger spring 24 extends to contact the lowermost ply 56 thereby resulting in a compound nested coil spring unit 12.

The nested spring unit 12 remains compressed between the compression plates 94, 96 as shown in FIG. 10 and as the fabric 58 is indexed forwardly, transverse weld lines 16 are formed in the fabric 58 at the first weld station 64 and the pockets 14 are completed with longitudinal welds 66 as in FIG. 2. The springs 18, 24 are subsequently turned so that their longitudinal axes 30, 32 are generally perpendicular to the fabric fold 60 and the seam 72.

Figure 5:
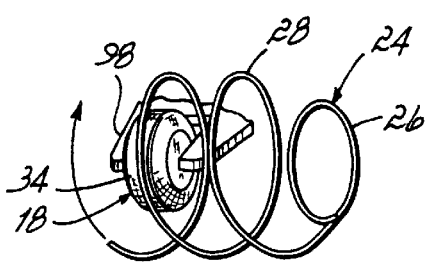
FIG. 5 is a schematic representation of another alternative preferred embodiment of this invention in which the larger outer coil spring is being formed around a compressed and pocketed smaller inner coil spring.
Figure 5A:
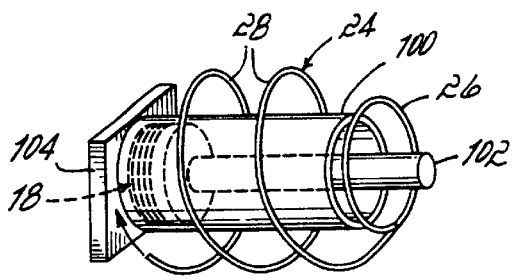
FIG. 5A is a view similar to FIG. 5 in which the inner coil spring is being compressed on a mandrel during the forming of the outer coil spring.

Referring to FIGS. 5–7A, alternative presently preferred embodiments according to this invention are shown for producing compound nested coil spring units 12. Each of the alternative embodiments shown in FIGS. 5–7A include forming the second larger outer coil spring 24 around the already formed and preferably pocketed or being formed first inner smaller coil spring 18. In particular, as shown in FIG. 5, the individual first inner coil spring 18 is enclosed in the pocket 34 compressed and held while spring wire is being drawn from a wire supply reel (not shown) and being formed in a coiler into the second larger outer coil spring 24. The first inner coil spring 18 is preferably pocketed and produced from any known conventional method and system, such as that shown in U.S. Pat. No. 4,439,977 or according to a Spühl pocketing machine as discussed previously herein. The inner first coil spring 18 is compressed and held between a pair of bifurcated arms 98 as shown in FIG. 5 or compressed on a tubular mandrel 100 by a plunger 102 against a block 104 as shown in FIG. 5A while forming the outer coil spring 24.

Figure 12:
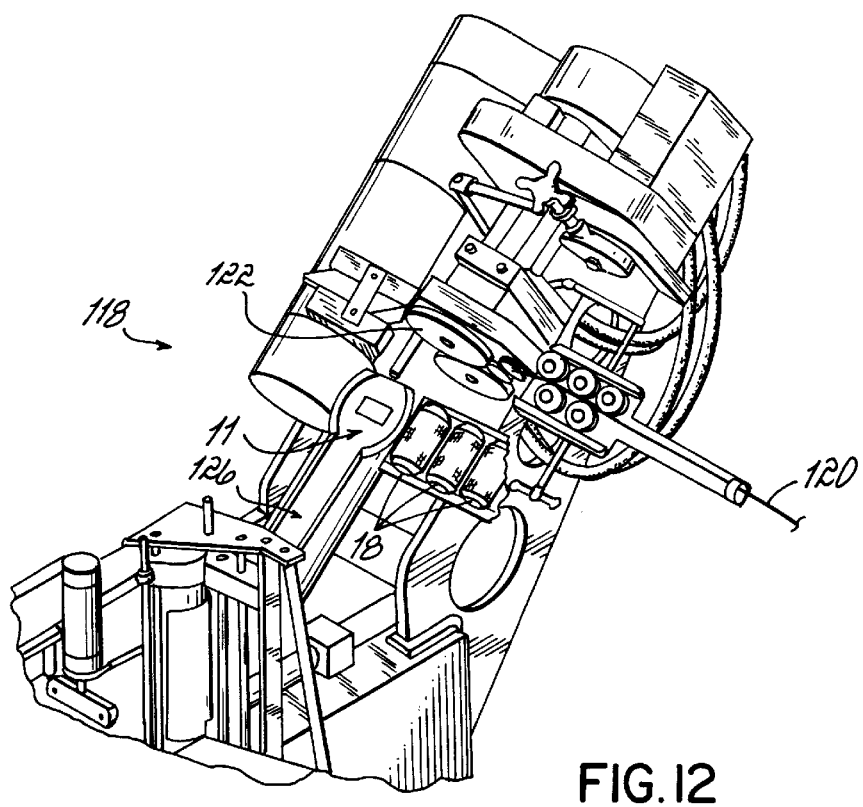
FIG. 12 is a perspective view of a system for forming compound nested coil springs in which a smaller pocketed coil spring is compressed and a larger coil spring is formed around the compressed inner coil spring.
Figure 13:
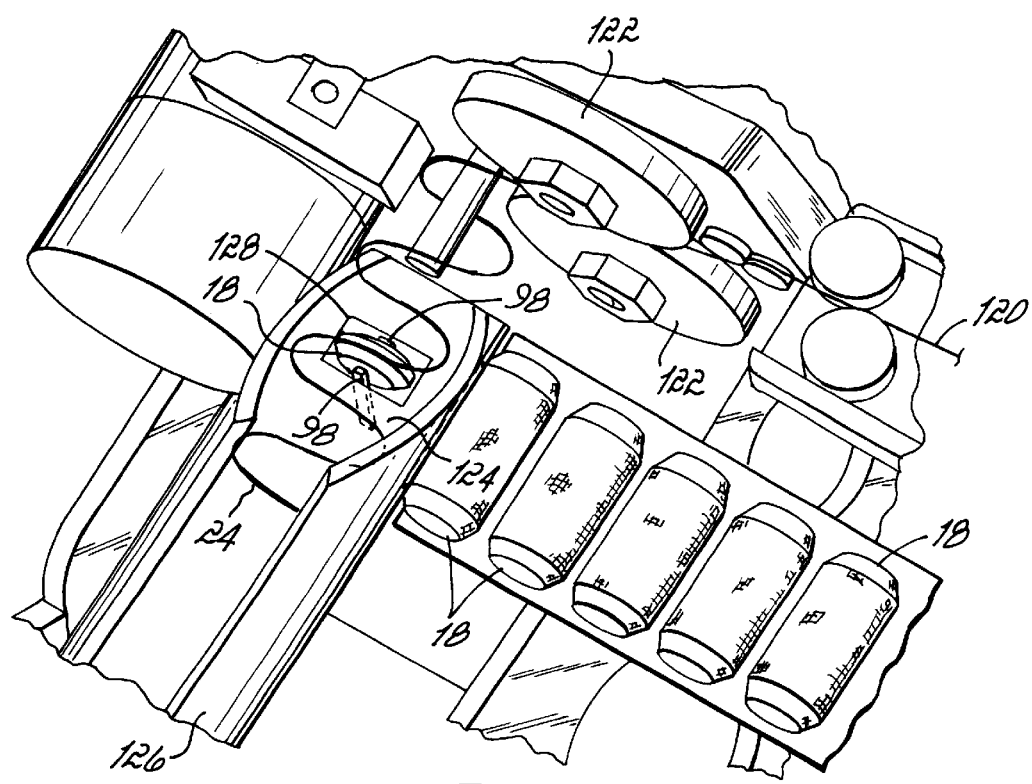
FIG. 13 is an enlarged view of a portion of the system FIG. 12 showing the outer, larger coil spring being formed around the compressed, smaller inner pocketed coil spring.

In a particular embodiment as shown in FIGS. 12 and 13, a system 118 similar to that disclosed in U.S. patent application Ser. No. 08/927,051 filed Sep. 10, 1997 is shown. The system 118 forms the second larger outer coil spring 24 at a coiling station 11 from a supply of coil wire 120 advanced through rotating coiling heads 122. The coil wire 120 forms the outer coil spring 24 around the already formed, and preferably pocketed and compressed smaller coil spring 18. A supply of pocketed smaller inner coil springs 18 is serially advanced to the coiling station 11 and each smaller coil spring 18 is compressed between reciprocating arms 98 as shown particularly in FIG. 13. The coil wire 120 for the outer coil spring 24 is formed around the compressed inner coil spring 18 within the upper open end 124 of a slotted guide tube 126. The compressed inner coil springs 18 are inserted between the arms 98 through an opening 128 in the guide tube 126. While the outer coil 24 is being formed and before the coil wire 120 for the outer coil 24 is cut or separated from the supply of coil wire, the arms 98 release the smaller inner coil spring 18 and allow it to expand within the formed outer coil 24. Subsequently, the outer coil spring 24 is separated from the coil wire 120 supply, the nested coil springs 12 fall within the guide tube 126 toward the lower end thereof. The guide tube 126 is then rotated approximately 45° to a generally vertical orientation and the nested coil springs 12 are then compressed and pocketed together as fully disclosed with respect to a single spring in U.S. patent application Ser. No. 08/927,051.

Figure 6:
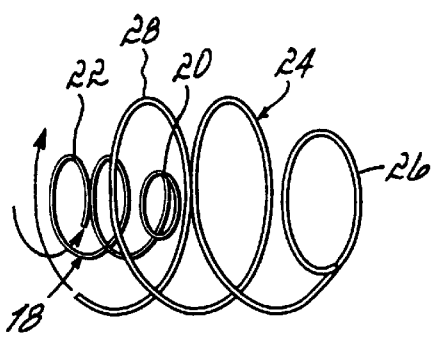
FIG. 6 is a schematic representation of another alternative preferred embodiment of this invention in which the inner and outer coil springs are being simultaneously formed with the inner smaller coil spring in the interior of the forming outer coil spring.

Alternatively, as shown in FIG. 6, the first and second coil springs 18, 24 may be simultaneously formed in a coiler adapted and designed for this purpose. Preferably, the inner and outer coil springs 18, 24 are formed at the same time, one being left-hand turned and one being right-hand turned so that the coils or convolutions of the respective springs 18, 24 do not interfere with one another during compression and expansion of the resulting nested compound spring unit 12.

Figure 7:
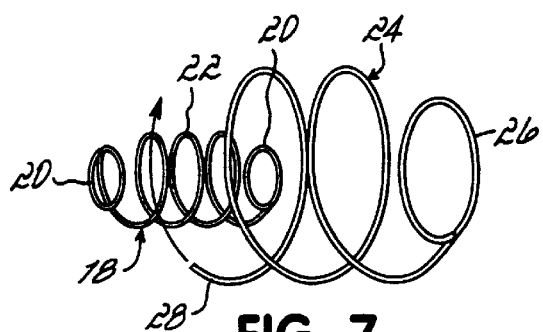
FIGS. 7 and 7A are further alternative embodiments according to this invention in which the outer coil spring is being formed around an expanded inner coil spring which is unpocketed or pocketed, respectively.
Figure 7A:
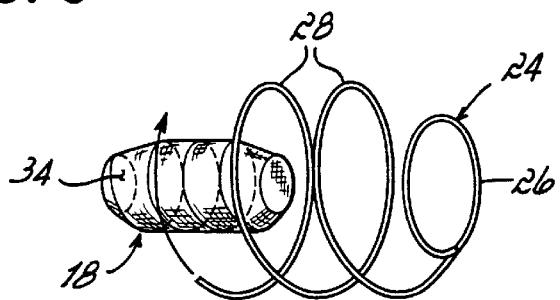

As shown in FIGS. 7 and 7A, the outer larger coil spring 24 may be formed in a coiler around an expanded inner coil spring 18 which may be unpocketed (FIG. 7) or pocketed (FIG. 7A) and produced according to any known conventional method and system as previously discussed.

Once formed and nested, the spring units 12 of FIGS. 5–7A may then be pocketed as is well known in the art for single springs.

Figure 1:
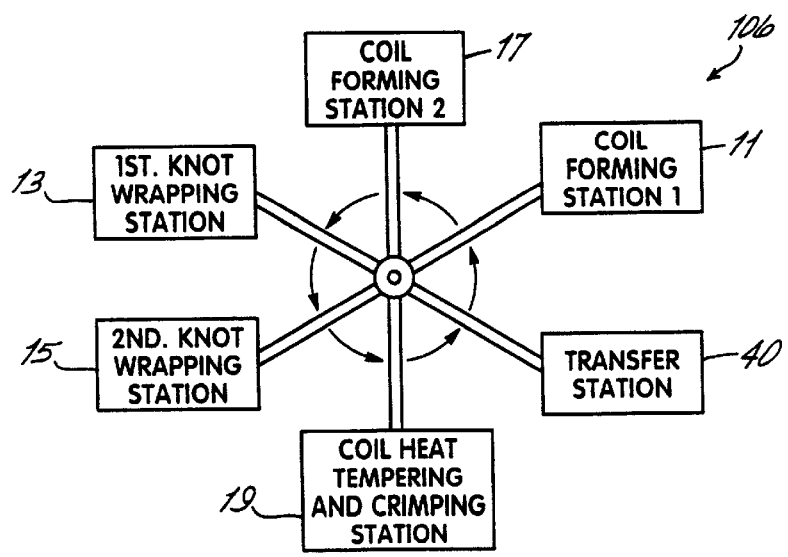
FIG. 1 is a schematic representation of a system for forming compound nested coil springs.

FIG. 1 is a schematic representation of a coiling station 106 which may be employed for producing the compound nested coil spring units 12 of FIGS. 5–7A or other embodiments thereof. A coiler similar to that disclosed in FIG. 1 is disclosed in detail in U.S. Pat. No. 5,934,339, assigned to the assignee of the present invention and hereby incorporated by reference in its entirety. The coiler 106 of the identified pending patent application is disclosed for forming a single coil spring, however, it may be adapted as described herein, for manufacturing a compound nested coil spring unit 12. The coiler 106 may include a first coil forming station 11 for forming the inner coil spring 18 which may or may not be compressed and then rotationally transferred to a second coil forming station 17 for forming the second outer coil spring 24 around the previously formed inner coil spring 18. The coiler 106 may include first and/or second wrapping stations 13, 15 for forming a knot (not shown) at the terminal end of the spring wires which form the coil springs. Additionally, the spring wire may be tempered, heat treated or otherwise conditioned at a subsequent station 19 provided the inner coil spring 18 is not pocketed. The spring unit 12 is transferred out of the coiler 106 via a transfer station or tube 40 for subsequent incorporation into a string 10 of pocketed coil springs as schematically shown in one presently preferred embodiment in FIG. 2.

A further alternative system and method for forming a compound nested coil spring comprises holding a formed outer larger second coil spring 24 with a gripper that is rotated from the coiling station to an insertion station similar to the rotating station schematically shown in FIG. 1. During the rotation, the inner coil spring 18 is inserted into the outer coil spring 24 through the terminal convolutions 26 or by compressing the inner coil spring 18 and passing it through or between the intermediate convolutions 28 of the outer coil spring 24.

Figure 11:
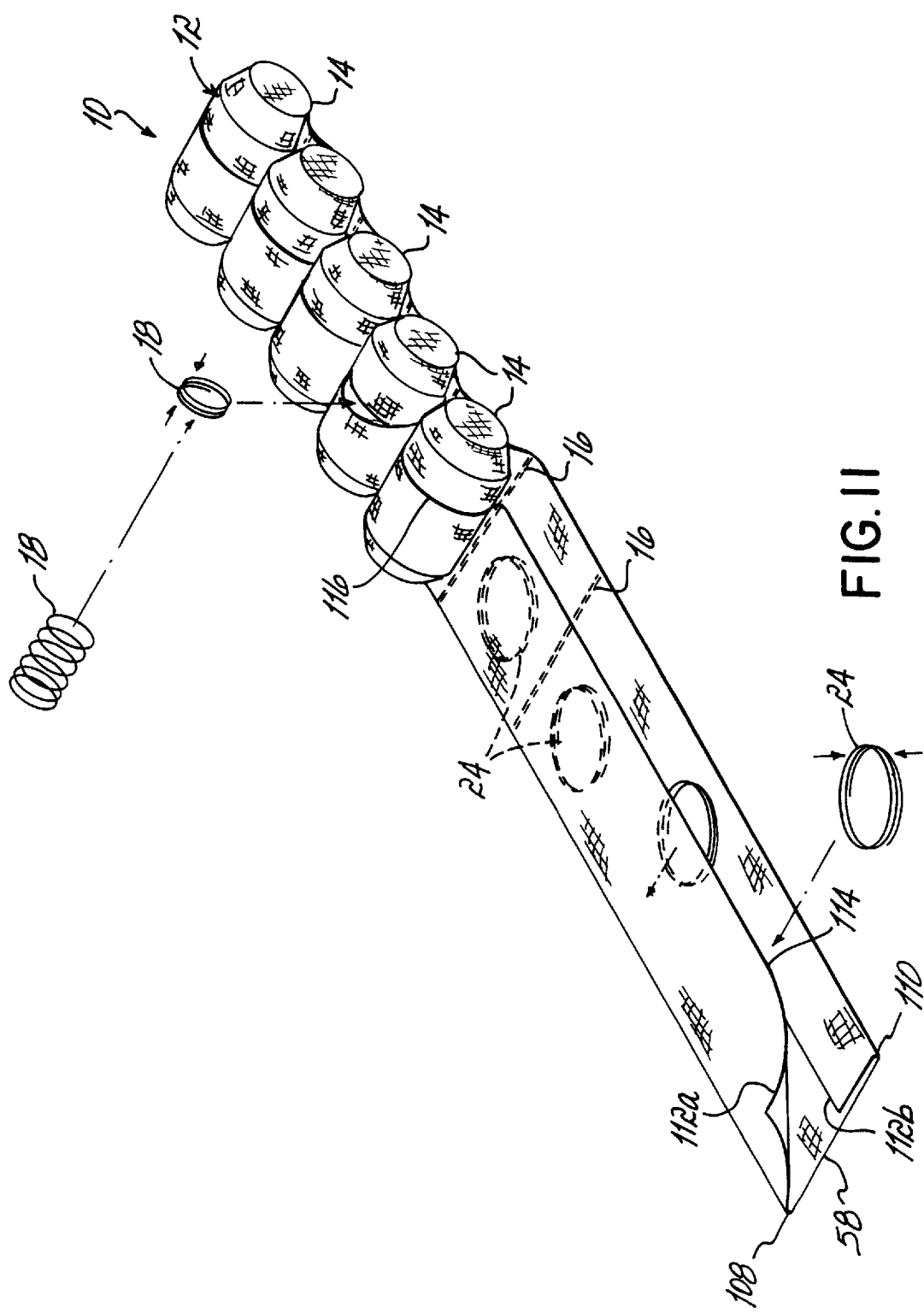
FIG. 11 is a schematic representation of a method for producing a string of compound nested pocketed coil springs according to a presently preferred embodiment in which the compressed inner coil springs are inserted between the overlapping flaps on a side of the formed string of larger pocketed coil springs.

A further presently preferred embodiment according to this invention is shown in FIG. 11 in which the preferably non-woven fabric 58 is folded on both sides with a small overlap of material. In other words, the fabric 58 is folded with first and second longitudinal fold lines 108, 110 so that the longitudinal terminal free edges 112a, 112b of the fabric overlap one another thereby providing an opening 114 through which the compressed outer coil spring 24 may be inserted between the flaps of overlapping fabric 58 which form a side seam 116. Transverse or lateral seams or welds 16 are then formed in the fabric 58 as is well known in the art thereby separating the adjacent outer coil springs 24 within the fabric 58 into individually encased fabric pockets 14. The springs 24 are then turned, as is well known in the art, by a rotating auger device 76 similar to that shown in FIG. 2 or another turning mechanism so that the longitudinal axis 32 of the springs 24 is generally horizontal or parallel to the transverse seams 16 and the springs 24 are permitted to expand within the individual fabric pockets 14.

Subsequently, previously formed inner coil springs 18 are compressed and then inserted between the overlapping flaps 112a, 112b of fabric 58 on the side seam 116 of the string of pocketed outer coil springs 24. The edges 112a, 112b of the fabric 58 preferably overlap about one-quarter to one-half inch. The inner coil springs 18 may be pocketed, unpocketed or of an opposite hand turn relative to the outer coil springs 24. Accordingly, as shown in FIG. 11 compounded nested pocketed coil springs 12 are formed by insertion of a compressed inner coil spring 18 between the overlapping flaps 112a, 112b on the side seam 116 of a string 10 of outer coil pocketed springs. When the string 10 of compound nested pocketed coil springs is incorporated into a spring unit, adjacent rows of the strings 10 may be glued or adhesively bonded together such that the side seam 116 will be sealed by adhesion to the adjacent row of coil springs.

From the above disclosure of the general principles of the present invention and the preceding detailed description of a preferred embodiment, those skilled in the art will readily comprehend the various modifications to which this invention is susceptible. Therefore, we desire to be limited only by the scope of the following claims and equivalents thereof.

We claim:

1. A method of forming a string of pocketed compound nested coil springs, the method comprising the steps of:

forming a plurality of individual first coil springs each of a first uncompressed height and having a longitudinal axis;

orienting each of the first coil springs with its longitudinal axis at a first inclination;

forming a plurality of individual second coil springs each of a second uncompressed height which is greater than the first uncompressed height of the first coil springs, each of the second coil springs having a longitudinal axis extending between spaced terminal coils thereof;

aligning the longitudinal axes of each of the first coil springs with one of the second coil springs;

nesting each of the first coil springs into one of the second coil springs by passing the first coil spring into one of the terminal coils of one of the second coil springs and thereby forming a nested spring unit;

compressing each of the first and second coil springs;

folding an elongate sheet of fabric about a longitudinal fold line into two plies of fabric joined by the longitudinal fold line;

inserting one of the first and one of the second coil springs between the plies of the folded fabric;

wherein the nesting of each of the first coil springs into one of the second coil springs occurs after the inserting between the plies of the folded fabric; and forming an individual pocket in the fabric around each of the nested spring units, wherein the individual fabric pocket is formed around each of the first coil springs prior to nesting it into one of the second coil springs.

2. The method of claim 1 wherein the compressing of each of the first and second coil springs occurs before the nesting and before the inserting.

3. The method of claim 2 wherein the nesting of the first and second coil springs and the inserting between the plies of the folded fabric further comprise:

mounting the first compressed coil spring on a first inserter plunger;

mounting the second compressed coil spring on a second inserter plunger;

separating the first and second inserter plungers with a separator plate;

inserting the first and second compressed coil springs mounted on the first and second inserter plungers, respectively, and the separator plate between the plies of the folded fabric;

removing the separator plate from between the first and second coil springs and thereby nesting the first coil spring within the second coil spring; and removing the first and second inserter plungers from the folded fabric and thereby depositing the first and second coil springs into the folded fabric.

4. The method of claim 1 wherein the first coil spring is not secured to the second coil spring after the nesting.

5. The method of claim 1 wherein the forming of the fabric into the pocket is accomplished by at least one of the steps of welding, stitching, and mechanical fastening of the fabric.

6. The method of claim 1 further comprising:

turning each of the nested spring units within the associated formed pocket so that the longitudinal axes of the coil springs are generally perpendicular to the longitudinal fold line of the fabric.

7. The method of claim 1 further comprising:

expanding the compound nested first and second coil springs within the pocket.

8. The method of claim 1 wherein the nested spring unit is inserted between the plies of the fabric without substantially re-orienting the longitudinal axes of the coil springs.

9. The method of claim 1 wherein the axes of the coil springs are generally vertical and the plies are generally horizontal prior to the insertion of the nested spring unit between the plies.

10. The method of claim 1 wherein the axes of the coil springs are generally horizontal and the plies are generally vertical prior to the insertion of the nested spring unit between the plies.

11. The method of claim 1 wherein the second coil spring is held relatively stationary with respect to the first coil spring being nested into the second coil spring.

12. The method of claim 11 wherein the first coil spring is inserted generally vertically into one of the terminal coils of the second coil spring.

13. A method of forming a string of pocketed compound nested coil springs, the method comprising the steps of:

forming a plurality of individual first coil springs each of a first uncompressed height and having a longitudinal axis;

orienting each of the first coil springs with its longitudinal axis at a first inclination;

forming a plurality of individual second coil springs each of a second uncompressed height which is greater than the first uncompressed height of the first coil springs, each of the second coil springs having a longitudinal axis extending between spaced terminal coils thereof;

compressing each of the first and the second coil springs;

aligning the longitudinal axes of each of the first coil springs with one of the second coil springs;

mounting the first compressed coil spring on a first inserter plunger;

mounting the second compressed coil spring on a second inserter plunger;

separating the first and second inserter plungers with a separator plate;

folding an elongate sheet of fabric about a longitudinal fold line into two plies of fabric joined by the longitudinal fold line;

inserting the first and second compressed coil springs mounted on the first and second inserter plungers, respectively, between the plies of the folded fabric;

removing the separator plate from between the first and second coil springs and thereby nesting the first coil spring within the second coil spring by passing the first coil spring into one of the terminal coils of the second coil spring and thereby forming a nested spring unit;

removing the first and second inserter plungers from the folded fabric and thereby depositing the first and second coil springs into the folded fabric; and forming an individual pocket in the fabric around each of the nested spring units.

14. A method of forming a string of pocketed compound nested coil springs, the method comprising the steps of:

forming a plurality of individual first coil springs each of a first uncompressed height and having a longitudinal axis;

forming a plurality of individual second coil springs each of a second uncompressed height which is greater than the first uncompressed height of the first coil springs, each of the second coil springs having a longitudinal axis extending between spaced terminal coils thereof;

wherein each of the second coil springs is formed around one of the first coil springs to thereby form a nested spring unit;

aligning the longitudinal axes of each of the first coil springs with one of the second coil springs;

compressing each of the first and second coil springs;

folding an elongate sheet of fabric about a longitudinal fold line into two plies of fabric joined by the longitudinal fold line; inserting the nested spring unit between the plies of the folded fabric; and forming an individual pocket in the fabric around each of the nested spring units.

15. The method of claim 1 further comprising:

forming an individual fabric pocket around each of the first coil springs prior to forming one of the second coil springs around it.

16. The method of claim 14 wherein the first coil spring is compressed prior to and during the forming of the second coil spring.

17. The method of claim 16 further comprising:

forming an individual fabric pocket around each of the first coil springs prior to compressing it and forming the second coil spring around it.

18. The method of claim 14 wherein the second coil spring is formed within a guide tube while the first coil spring is positioned within the guide tube.

19. A method of forming a string of pocketed compound nested coil springs, the method comprising the steps of:
- forming a plurality of individual first coil springs each of a first uncompressed height and having a longitudinal axis;
- forming a plurality of individual second coil springs each of a second uncompressed height which is greater than the first uncompressed height of the first coil springs, each of the second coil springs having a longitudinal axis extending between spaced terminal coils thereof;
- wherein the first and second coil springs are formed simultaneously with each of the second coil springs being formed around one of the first coil springs to thereby form a nested spring unit;
- aligning the longitudinal axes of each of the first coil springs with one of the second coil springs;
- compressing each of the first and second coil springs;
- folding an elongate sheet of fabric about a longitudinal fold line into two plies of fabric joined by the longitudinal fold line;
- inserting the nested spring unit between the plies of the folded fabric; and
- forming an individual pocket in the fabric around each of the nested spring units.

20. The method of claim 19 wherein the first and second coil springs are formed with coils of opposite orientations with respect to one another.

21. A method of forming a string of pocketed compound nested coil springs, the method comprising the steps of:
- forming a plurality of individual first coil springs each of a first uncompressed height and having a longitudinal axis;
- encasing each of the first coil springs in a first pocket;
- compressing each of the first coil springs;
- forming a plurality of individual second coil springs within a guide tube, each of the second coil springs having a second uncomnpressed height which is greater than the first uncompressed height of the first coil springs, each of the second coil springs being formed around one of the first coil springs and having a longitudinal axis extending between spaced terminal coils thereof, upon completion of each of the second coil springs the first coil spring and the second coil spring thereby forming a nested spring unit;
- re-orienting the guide tube and the nested spring unit therein toward a generally vertical orientation;
- compressing each of the nested spring units;
- folding an elongate sheet of fabric about a longitudinal fold line into two plies of fabric joined by the longitudinal fold line;
- inserting the nested spring unit between the plies of the folded fabric; and
- forming an individual second pocket in the fabric around each of the nested spring units.

22. A method of forming a string of pocketed compound nested coil springs, the method comprising the steps of:
- forming a plurality of individual first coil springs each of a first uncompressed height and having a longitudinal axis;
- forming a plurality of individual second coil springs each of a second uncompressed height which is greater than the first uncompressed height of the first coil springs, each of the second coil springs having a longitudinal axis extending between spaced terminal coils thereof;
- compressing each of the first coil springs;
- compressing each of the second coil springs;
- folding an elongate sheet of fabric about a first and a second longitudinal fold line so that terminal free edges of the elongate sheet of fabric overlap one on another;
- inserting each of the compressed second coil springs between the overlapped terminal free edges of the elongate sheet of fabric;
- forming transverse seams in the elongate sheet of fabric between each adjacent pair of compressed second coil springs and thereby forming a fabric pocket around each of the compressed coil springs;
- re-orienting each of the second coil springs so that the longitudinal axis of each second coil spring is generally parallel to the transverse seams and generally perpendicular to the first and second longitudinal fold lines;
- allowing each of the second coil springs to expand within their respective fabric pockets;
- inserting each of the compressed first coil springs between the overlapped terminal free edges of the elongate sheet of fabric and into the fabric pocket and the interior of one of the second coil springs and thereby forming a nested spring unit within each fabric pocket; and
- allowing each of the first coil springs to expand.

23. The method of claim 22 further comprising:
- encasing each of the first coil springs within an individual pocket prior to inserting it into one of the second coil springs.

* * * * *

UNITED STATES PATENT AND TRADEMARK OFFICE
CERTIFICATE OF CORRECTION

PATENT NO.   : 6,408,514 B1
DATED        : June 25, 2002
INVENTOR(S)  : Niels S. Mossbeck and Thomas J. Wells It is certified that error appears in the above-identified patent and that said Letters Patent is hereby corrected as shown below:

Column 5,
Line 55, "(FIGS. 607." should read -- FIGS. 6-7 --.

Column 12,
Lines 49-53, "fold line into two plies of fabric joined by the longitudinal fold line; inserting the nested spring unit between the plies of the folded fabric; and forming an individual pocket in the fabric around each of the nested spring units" should read
-- fold line into to plies of fabric joined by the longitudinal fold line;
      inserting the nested spring unit between the plies of the folded fabric;
and
      forming an individual pocket in the fabric around each of the nested
spring units --.
Line 54, "The method of claim 1 further" should read -- The method of claim 14 further --.

Column 13,
Line 39, "uncomnpressed" should read -- uncompressed --.

Signed and Sealed this

Twelfth Day of November, 2002

Attest:

Attesting Officer

JAMES E. ROGAN
Director of the United States Patent and Trademark Office